United States Patent [19]
Araki et al.

[11] 3,791,847
[45] Feb. 12, 1974

[54] PROCESS FOR THE PRODUCTION OF INCOMBUSTIBLE CARBONACEOUS MATERIAL

[75] Inventors: Tadashi Araki; Kiro Asano, both of Tokyo; Jyuniti Koshugi, Urawa, all of Japan

[73] Assignee: Kureha Kagaku Kogyo Kabushiki Kaisha, Tokyo, Japan

[22] Filed: July 26, 1971

[21] Appl. No.: 166,118

[30] Foreign Application Priority Data
July 27, 1970  Japan.................................. 45-65050

[52] U.S. Cl. ..... 117/46 CG, 117/106 R, 117/106 C, 117/124 A, 117/127, 117/DIG. 11, 423/299, 423/445, 423/458

[51] Int. Cl. C01b 25/00, C01b 25/08, C01b 31/30, C23c 11/00

[58] Field of Search ....... 117/46 CB, 46 CC, 46 CG, 117/106 R, 106 C, 124 A, 127, DIG. 11; 23/209.2, 223; 423/299, 322, 323, 445, 458; 260/606.5 P

[56] References Cited
UNITED STATES PATENTS

| | | | |
|---|---|---|---|
| 3,157,541 | 11/1964 | Heywang et al. | 117/106 C |
| 3,512,932 | 5/1970 | Stern et al. | 423/299 |
| 2,736,642 | 2/1956 | Baker et al. | 23/209.2 |
| 3,652,221 | 3/1972 | Sloka | 23/209.2 |
| 1,856,756 | 5/1932 | Frigiola | 117/46 CC |
| 1,895,063 | 1/1933 | Zurcher | 23/209.2 |
| 3,335,094 | 8/1967 | Darby | 23/223 |
| 3,427,120 | 2/1969 | Shindo et al. | 23/209.2 |

*Primary Examiner*—William D. Martin
*Assistant Examiner*—M. Sofocleous

[57] ABSTRACT

A carbonaceous material is obtained by bringing a mixture of one or more substances selected from the group consisting of molecular phosphorus, inorganic phosphorus-containing compounds and organic phosphorus-containing compounds and organic compounds into contact with a substrate heated at a temperature of 600°–1,500°C thereby depositing the resulting carbon formed by pyrolysis on the substrate. Alternatively, an organic phosphorus-containing aromatic compound is brought into contact with a substrate heated at a temperature of 600°–1,500°C thereby depositing the resulting carbon formed by pyrolysis on the substrate. A shaped article coated with said carbonaceous material is obtained by effecting such pyrolysis and deposition on a shaped article made of metal, ceramics glass or carbon. The carbonaceous materials obtained according to this invention are composed of 80–99.9% of carbon and 0.1–20% of phosphorus and are imcombustible having excellent oxidation-resisting properties in addition to the intrinsic properties of carbon.

13 Claims, 1 Drawing Figure

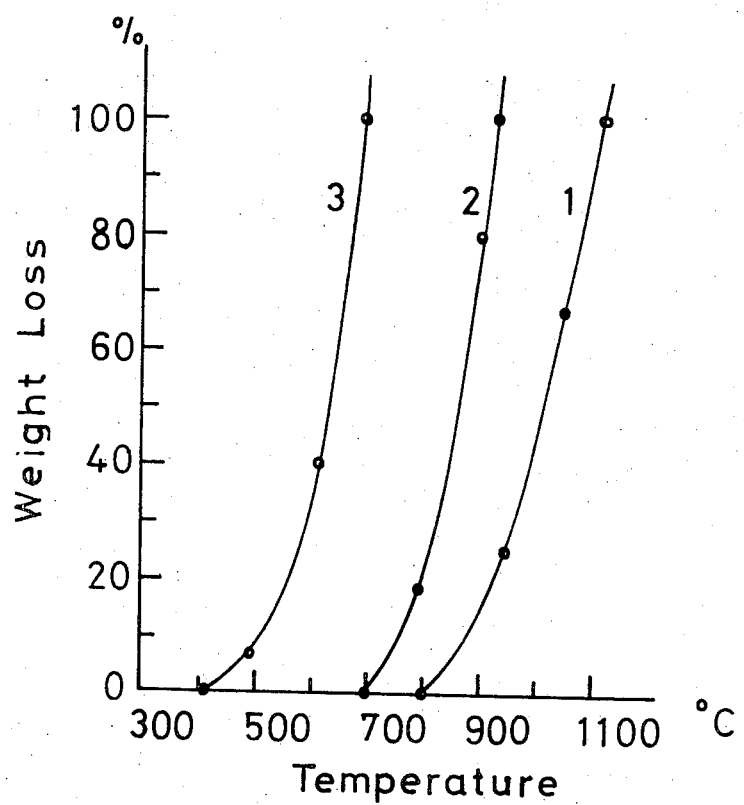

PROCESS FOR THE PRODUCTION OF INCOMBUSTIBLE CARBONACEOUS MATERIAL

This invention relates to a process for the production of incombustible carbonaceous material by pyrolyzing within a definite temperature range a mixture of an organic compound and one or more materials selected from the group consisting of molecular phosphorus, inorganic phosphorus-containing compounds and organic phosphorus-containing compounds. Alternatively one or more organic phosphorus-containing compounds may be pyrolyzed. This invention relates also to shaped articles of metal, ceramics glass or carbon, having surfaces coated with the incombustible carbonaceous material.

As is commonly known, carbonaceous materials have excellent thermal conductivity, electric conductivity, heat stability, mechanical properties and corrosion resistance, but have poor oxidation resistance. Although many improvements have been proposed heretofore to overcome this defect, the purpose has not yet been attained.

It is a purpose of this invention to provide a carbonaceous material having excellent oxidation-resistance. It has now been discovered that a carbonaceous material composed of 80–99.9% of carbon and 0.1–20% of phosphorus and obtained from a mixture of phosphorus or a phosphorus-containing compound and an organic compound having a vapor pressure by bringing the mixture into contact with a substrate heated at a temperature of 600°–1,500°C thereby depositing the resulting carbon formed by pyrolysis on the substrate, is surprisingly incombustible and, moreover, the properties such as thermal conductivity, electric conductivity, heat stability and corrosion resistance of the pyrolysis carbon are scarcely diminished.

It is still difficult to give any distinct answer as to why the carbon-phosphorus composition exhibits such properties. It is also difficult to infer the nature of the carbonaceous material of this invention from the existing literatures. Further, it is difficult to determine whether the structure of the carbonaceous material is to be regarded as a mixture, or as a new substance wherein carbon and phosphorus are chemically bound. Although elucidation of this question awaits further physicochemical studies, the product is referred to herein as a carbonaceous material. The carbonaceous material of this invention retains the physical properties inherrent to carbon and also has excellent oxidation-resistance.

The carbonaceous material of this invention can easily be obtained by mixing phosphorus or a phosphorus-containing compound in a desired proportion with an organic compound, preferably one having a ring structure, or a mixture thereof, diluting the mixture, if necessary, with an inert gas and bringing the mixture into contact with a substrate heated at 600°–1,500°C thereby depositing the resulting carbon formed by pyrolysis on the substrate. The carbonaceous material is also obtained by using an organic phosphorus-containing compound alone, particularly one having aromatic rings, under the same conditions as described above, to effect pyrolysis and deposition.

The organic compounds having one or more condensed rings used as the carbon source may contain oxygen, nitrogen, sulphur and like elements and are not restricted only to hydrocarbons. These compounds include aliphatic hydrocarbons such as methane, ethane, propane etc.; and cyclic hydrocarbons, aromatic and alicyclic, as well as their alkyl derivatives such as benzene, cyclohexane, cyclopentane, naphthalene, tetralin, decalin, indene, indane, acenaphthene, fluorene, anthracene, phenanthrene, pyrene, naphthacene, chrysene, triphenylene, perylene, etc.

Various olefines such as ethylene, propylene, butylene and pentadiene can be used in this invention. Suitable compounds having heterocyclic rings, include nitrogen-containing compounds such as indole, quinoline, carbazole, phenanthrazine, etc.; oxygen-containing compounds such as phenol, anthraquinone, naphthoquinone, diphenylene oxide, etc.; sulphur-containing compounds such as thionaphthene, thiophenol, diphenylene sulfide, etc. Alkyl derivatives of said heterocyclic compounds can also be used as the starting material of this invention. Such compounds partially substituted with amino groups, hydroxy groups, carbonyl groups, etc. can be used in this invention as an effective carbon source. Compounds having an aromatic structures are preferred from the aspect of the reaction rate and the yield of carbon. Most preferred are those having a polycyclic structure.

As the carbon source of this invention, fractions containing a large amount of cyclic compounds can also be used. Such fractions or mixtures include crude by-products having a boiling point higher than 200°C; residual oils formed as by-product in petroleum-refining industry such as vis beaker residual oil, coker residual oil, catalytically cracked recycle oil, dealkylated residual oil, bottom oil obtained by distillation under reduced pressure, etc. Various residual oils obtained in the field of petrochemistry such as bottom oil formed in the production of ethylene, tars formed in the production of ethylene-acetylene, oily tars formed in gasification, etc. are also useful starting materials in this invention. So-called coal-tar fractions formed in the dry distillation of coal are also preferred starting materials. Since the residual oils which have been regarded as useless material can be utilized in this invention as embodiment starting materials, this point offers a definite economic advantage.

The phosphorus used in this invention may be molecular phosphorus such as yellow phosphorus, red phosphorus etc., while the phosphorus-containing compounds may be phosphorus hydrides such as phosphine, diphosphine, etc.; phosphorus oxides such as phosphorus trioxide, phosphorus pentoxide, etc.; phosphoric acid; phosphorus sulfides; phosphorus chlorides duch as phosphorus trichloride, phosphorus pentachloride, etc.; thiophosphonyl trichloride; phosphonitrile halides and so on.

Suitable organic phosphorus-containing compounds include primary, secondary and tertiary phosphines, phosphine halides, phosphonyl halides, thiophosphonyl halides, phosphonium compounds, alkyl phosphates, alkyl phosphites, and so on. Among these phosphorus-containing compounds, those having aromatic rings such as triphenyl phosphine and triphenyl phosphate can be used alone without the necessity of being mixed with other organic compounds.

The contents of carbon and phosphorus in the carbonaceous material obtained in this invention are within the ranges of 80–99.9% and 0.1–20%, respectively. A phosphorus content of less than 0.1% results in little enhancement of a oxidation-resisting property, while the content of more than 20% diminishes the economic advantage that otherwise results from the use of cheap carbon sources, and diminishes the desirable properties inherent to carbon. Although the phosphorus or phosphorus-containing compound may be mixed in any desired ratio with the carbon source to make the composition, the compound is preferably used in an amount of 10% by volume of the carbon source (in the standard case) and at most 20%. The amount may be varied within this range according to the properties of carbon source.

The carbon source and the phosphorus source may be pyrolyzed directly after they are mixed. No change occurs when they are pyrolyzed after being diluted with an inert gas. However, it is preferable to dilute the mixture with an inert gas to an appropriate concentration, for controlling pyrolysis.

The conditions for pyrolysis depend on the heat stability of the substrate and are generally kept within a temperature range of 600°–1,500°C and for a period of one second to 10 hours. The pyrolysis reaction of this invention is a reaction forming a solid material from gaseous materials. The upper limit of the pyrolysis time is determined chiefly according to the desired thickness for the deposit.

The phosphorus-containing carbon which is pyrolytically deposited on the substrate can be isolated by rapid cooling or other conventional means. The phosphorus-containing carbon thus obtained is a substance unknown in the literature and so determination of the structure awaits further studies. This material is expected to find utility in many fields as a new material which has an enhanced oxidation-resisting property plus properties inherent to pyrolysis carbon.

The carbon may be coated onto a substrate without subsequent removal. When a metallic substrate is used, both corrosion-resistance and oxidation resistance are imparted to the metallic substrate. In the case of glass substrates such as glass fiber, quartz fiber, quartz, etc., not only is a oxidation-resisting property imparted to the substrates but also their alkali-resisting property is improved. In the case of a carbonaceous substrate, it will be coated with oxidation-resisting carbon, thus enhancing its utility.

This invention will be explained more in detail by way of the following examples.

EXAMPLE 1

A tar fraction (boiling point: 200°–450°C; containing 45% components having two condensed rings, 45% components having three condensed rings and 10% components having four condensed rings) was mixed with 10% by volume of triphenyl phosphine and the mixture was vaporized by heating at 400°C. The vapor was diluted to about 1% with nitrogen gas, pyrolyzed by bringing the vapor at a flow rate of 10 l./min. into contact with the surface of a quartz plate heated at 1,000°C to deposit phosphorus-containing carbon on the surface. The plate was cooled rapidly and the deposited product was peeled off. This product was compared with that produced from the tar fraction by effecting pyrolysis, deposition, rapid cooling and peeling under the same conditions described above without mixing with the phosphorus-containing compound, and with that of a commercial carbonaceous material. Next, the weight of the product was determined at various heating temperatures in the air using a differential thermal analyzer at a temperature elevation rate of 5°C/min. and at an air flow rate of 0.2 l./ min., the results being shown in FIG. 1. As is evident from the figure, the phosphorus-containing carbon (1) showed a smaller in "loss in weight" at high temperatures than the phosphorus-free carbon (2) and the commercially available carbonaceous material (3). Thus, the product of this invention was improved greatly with regard to oxidation-resistance.

The phosphorus-containing carbonaceous material contained 15.4% of phosphorus by weight and had a density of 2.08.

EXAMPLE 2

Nitrogen gas mixed with 0.6 vol.% of one of the various heterocyclic compounds and 0.06 vol.% of one of the various phosphorus-containing compounds, both compounds being shown in Table 1, was brought into contact at a flow rate of 10.1./min. with the surface of a quartz plate for 5 hours and pyrolytically deposited thereon. The deposited plate was cooled rapidly, peeled and subjected, after shaped into a test piece of 2 cm × 2 cm in size, to a combustion test in the air at 750°C for 1 hour.

TABLE 1

| Organic compound | Starting material for pyrolysis Phosphorus-containing compound | Pyrolyzing temperature (°C) | Phosphorus content (%) | Loss in weight by oxidation (mg/cm$^2$/hr) |
|---|---|---|---|---|
| Methane | $PH_3$ | 1.500 | 13 | 0.00 |
| Benzene | $PCl_3$ | 800 | 9 | 0.02 |
| Cyclopentadiene | $(CH_3)_3P$ | 900 | 9 | 0.01 |
| Naphthalene | P | 1.200 | 15 | 0.00 |
| Anthracene | $CH_3 \cdot PH_2$ | 750 | 7 | 0.02 |
| Phenol | $C_6H_5P=PC_6H_5$ | 1.000 | 10 | 0.00 |
| Thiophene | $PSCl_3$ | 900 | 10 | 0.00 |
| Ethylene bottom oil (250°–400°C) | $P_2O_3$ | 1.000 | 15 | 0.00 |
| Oily tar (250°–350°C) obtained by pyrolysis of petroleum | $(CH_3)_3PO_4$ | 1.000 | 15 | 0.00 |
| Coal tar (200–400°C) | $(C_6H_5)_3P$ | 1.000 | 10 | 0.00 |
| — | $C_6H_5P=PC_6H_5$ | 1.000 | 3 | 0.90 |
| — | $(C_6H_5)_3P$ | 1.000 | 1 | 8.00 |
| Coal tar (for comparison) | — | 1.000 | — | 200.00 |

The results obtained by using coal tar alone and by using $C_6H_5P=PC_6H_5$ or $(C_6H_5)_3P$ alone are also shown in the table for comparison. The table obviously shows that the products of this invention are excellent.

EXAMPLE 3

A tar fraction (boiling point: 200°–400°C; containing 98% of aromatic compounds) obtained as a by-product in the production of acetylene and ethylene by high temperature pyrolysis of naphtha was mixed with 20% by weight based on the tar of methyl phosphate and the mixture was diluted to 10% by volume with nitrogen as carrier gas, pre-heated at 400°C and introduced into an apparatus for pyrolysis. On the other hand, a felt made of a carbonaceous yarn having a weight of 1,000 g/m², a bulk density of 0.10 g/cc and an apparent thickness of 11 mm was introduced at a rate of 2 m/min. into said apparatus where the surface of felt was heated indirectly at 1,000°C and continuously brought into contact with the gaseous mixture so that the surface was coated with incombustible carbon. The physical properties of this sample were compared with those of the untreated sample, the results being shown in Table 2, which obviously shows that this invention is excellent.

TABLE 2

|  | Untreated felt | Treated felt (this invention) |
|---|---|---|
| Rate of compressive deformation (%) | 9.4 | 9.2 |
| Bursting strength (Kg/10 cm width; longitudinal) | 1.8 | 2.4 |
| Bursting strength (Kg/10 cm width; tranverse) | 1.8 | 2.4 |
| Rate of absorption of water (%) | 7–9 | 0 |
| Loss in weight by oxidation with air, 750°C-1 hr. | burnt | 0.00 |
| Boiling with concentrated nitric acid (60%) for 3 hrs. | deformed to powder | unchanged |
| Phosphorus content (%) | 0 | 14 |

EXAMPLE 4

A bottom oil (boiling point: 200°–250°C; containing more than 85% of aromatic compounds) obtained in the production of ethylene by pyrolysis of petroleum naphtha with superheated steam was mixed with 10% by volume of trimethyl phosphine and the mixture was diluted to 1% by volume with nitrogen gas. The gaseous mixture was brought into contact for 30 minutes with a yarn (having an outer diameter of 4 mm, a length of 240 mm and a weight of 1.4 g) made of quartz fibers and heated at 1,000°C, to form a material coated with incombustible carbon. The coated product of this invention was compared with the untreated material and the results are shown in Table 3.

TABLE 3

|  |  | Untreated material | Treated material |
|---|---|---|---|
| Corrosion-resisting properties | 10% NaOh solution (boiling 12 hours) loss in weight (%) | gelled | unchanged |
|  | 5% Hydrofluoric acid (room temperature, 1 hour) loss in weight (%) | reacted and disappeared | unchanged |
|  | 60% HNO₃ solution (boiling, 1 hour) loss in weight (%) | 0.2 | unchanged |
| Oxidation-resisting property | heating, 750°C - 1 hour, loss in weight (%) | — | 0.00 |
|  | Phosphorus content (%) | — | 5 |

EXAMPLE 5

Nitrogen gas containing 0.6% by volume of phosphobenzene ($C_6H_5P=PC_6H_5$) was brought at a flow rate of 5 l./min. into contact for 1 hour with a mild steel plate heated at 1,000°C, whereby the mild steel plate coated with a incombustible carbon layer having a thickness of about 10 $\mu$ was obtained.

The mild steel plate of this invention was compared with the untreated plate and the results are shown in Table 4.

TABLE 4

| Corrosive | Temperature (°C) | Time | Untreated material (g/cm²) | Treated material of this invention |
|---|---|---|---|---|
| Sea-water | 70 | 10 days | 0.1 | 0.00 |
| Hydrochloric acid (30%) | 20 | 5 hours | 0.04 | 0.0000 |
| Sulfuric acid (30%) | do. | do. | 0.0005 | 0.0000 |
| Nitric acid (1-N) | do. | do. | 0.11 | 0.0000 |
| Caustic soda (10%) | do. | do. | 0.0009 | 0.0000 |

These results show that the product of this invention is greatly improved in corrosion-resisting properties.

What is claimed is:

1. A process for producing oxidation-resistant carbon comprising:

vaporizing a phosphorus-containing aromatic organic compound or a mixture of a phosphorus compound and an aromatic organic compound, said phosphorus-containing compound or said mixture being capable of undergoing vapor phase pyrolysis; and contacting the vapor with a solid substrate having a temperature sufficient to effect vapor phase pyrolysis of the vapor whereby said vapor is pyrolized to form a coating of phosphorus-containing carbon on said substrate.

2. The process of claim 1 wherein said solid substrate temperature is maintained at a temperature of 600°–1,500°C.

3. The product formed by the process of claim 1.

4. The product of claim 1 wherein said coating of phosphorus-containing carbon contains 0.1–20% by weight phosphorus and 80–99.9% by weight carbon.

5. A process for the production of oxidation-resistant carbon comprising:

vaporizing a polycyclic aromatic phosphorus-containing compound, or a mixture of phosphorus or a phosphorus compound and a polycyclic aromatic organic compound, said phosphorus-containing compound or said mixture being capable of undergoing vapor phase pyrolysis; and contacting the vapor with a solid substrate having a temperature sufficient to effect pyrolysis of the vapor whereby said vapor is pyrolized to form a coating of phosphorus-containing carbon on said substrate.

6. The process of claim 5 wherein said polycyclic organic compound is selected from naphthalene, tetralin, decalin, indene, indane, acenaphthene, fluorene, anthracene, phenanthrene, pyrene, naphthacene, chrysene, triphenylene, and perylene.

7. The process of claim 5 wherein said polycyclic aromatic phosphorus-containing compound is selected from triphenyl phosphine and triphenyl phosphate.

8. The process of claim 5 wherein said vapor is diluted with an inert gas prior to pyrolysis.

9. The process of claim 5 wherein said phosphorus or phosphorus compound constitutes 20% by volume or less of said mixture.

10. The process of claim 5 where said polycyclic aromatic organic compound or said polycyclic aromatic phosphorus-containing compound has two or more condensed rings.

11. The process of claim 5 wherein said solid substrate temperature is maintained at a temperature of 600°–1,500°C.

12. The process of claim 11 wherein said pyrolysis is performed for a period of 1 second to 10 hours.

13. The process of claim 11 wherein said substrate is metal, glass or carbon.

* * * * *

UNITED STATES PATENT OFFICE
CERTIFICATE OF CORRECTION

Patent No. 3,791,847          Dated  February 12, 1974

Inventor(s)  Tadashi Araki et al

It is certified that error appears in the above-identified patent and that said Letters Patent are hereby corrected as shown below:

In the ABSTRACT, line 20, "imcombustible" should read --incombustible--.

IN THE SPECIFICATION:

Column 2, line 29, after "in" insert --the--;

line 42, delete "embodiment"; delete "point" and insert --embodiment--;

Column 4, line 39, delete "both";

line 40, delete "compounds being shown" and insert --listed--;

line 45, before "air" delete --the--.

Column 5, line 4, delete "The table obviously shows";

line 5, delete the entire line;

line 25, after "2" insert --.--; delete "which obviously shows that this invention is excel-;

line 26, delete the entire line;

line 45, "250°C" should read --350°C--.

Signed and Sealed this sixteenth Day of December 1975

[SEAL]

Attest:

RUTH C. MASON
Attesting Officer

C. MARSHALL DANN
Commissioner of Patents and Trademarks